TONE ARM WITH CARRIAGE SERVO

Filed April 29, 1963 2 Sheets-Sheet 1

INVENTOR

Jacob Rabinow

BY Joseph A. Genovese & Max L. Libman

ATTORNEYS

TONE ARM WITH CARRIAGE SERVO

Filed April 29, 1963 2 Sheets-Sheet 2

INVENTOR

Jacob Rabinow

BY Joseph A. Genovese & Max L. Libman

ATTORNEYS 3,249,362

TONE ARM WITH CARRIAGE SERVO

Jacob Rabinow, 6920 Selkirk Drive, Bethesda, Md.

Filed Apr. 29, 1963, Ser. No. 276,469
7 Claims. (Cl. 274—23)

This application is a continuation in part of my copending application Serial No. 156,057, now Patent No. 3,129,946.

This invention relates to record players and particularly to the tone arm assemblies of record players.

Many record players use pivoted tone arms, and as is now well known, inherent tracking errors are responsible for objectionable distortions in the audio. The geometry of the now common off-set pivoted tone arm is more favorable than an ordinary pivoted tone arm, and it appreciably reduces tracking error. But the off-set tone arms give rise to objectionable side pressures between the stylus and side walls of the record groove.

There are prior patents disclosing mechanisms to eliminate tracking error and objectionable stylus-to-groove side pressures. For example, the J. Rabinow patent No. 2,915,315 discloses a straight-line tone arm which eliminates tracking error by requiring the line of tension of the tone arm to be tangent to the portion of the record grooves being tracked. My prior patent also discloses a servo system to eliminate stylus-to-groove side presures. The J. Rabinow patent No. 3,129,946 is addressed to the same problems, and is especially directed to a unique bi-directional servo having a steering roller and smooth shaft as a servo means.

The above Patent No. 3,129,946 discloses the concept of a motor-driven live shaft supporting a tone arm for translation axially of the shaft. The shaft-to-arm coupling is made by a free-turning roller or wheel attached to the tone arm and supporting the arm by resting on the shaft. The servo function is obtained as follows: as long as the axis of rotation of the roller is parallel to the axis of the shaft, the roller-supported part of the tone arm will remain at a given position on the shaft because the roller idles, i.e. turns freely without introducing a lateral force component to the tone arm. However, when the axis of the roller is skewed even very slightly with respect to the axis of the rotary shaft, the roller introduces a force component to the tone arm, moving it axially on the shaft until the axes are parallel. This motion is analogous to the side-way motion of a steering wheel of a vehicle running on a treadmill. The side-way velocity is caused by the angle between the plane of the wheel and the direction of motion of the treadmill. The velocity persists as long as the axis of the roller is skewed. When the skew angle increases (for example by a "drastic" change in pitch of the record groove), the steering component of force is correspondingly increased to move the tone arm parallel to the shaft at a higher rate. If there are times in the playing of the record that the roller is not skewed with respect to the rotary shaft, there is no component of force tending to displace the roller (and thus, the tone arm) along the shaft bi-directional servo motion is inherently in this system, because the tone arm will move either left or right depending on whether the skew angle of the roller axis is in one direction or the other with respect to the longitudinal axis of the rotating shaft.

The simplest way to incorporate a bi-directional servo such as this, in a record player tone arm assembly is to connect the steering roller directly to the tone arm and have it support the tone arm near its balance point on the rotating shaft, as disclosed in the above patent. My present invention provides refinements in the basic system disclosed in that patent.

A major difference between my present invention and that illustrated in the above patent is that the steering roller in the pending application not only provides servo correction and propulsion for the tone arm but it also supports the mass of the tone arm and everything attached to it. In my present invention the wheel provides servo correction and propulsive force for a support, e.g. a carriage on a guide, e.g. a track, to which the tone arm is pivotally connected. Thus the mass of the tone arm is borne by the track and not by the steering wheel which engages the rotating shaft.

Numerous advantages are obtained by using a carriage in combination with the rotating shaft and steering roller. For instance, it is possible or at least mechanically simpler, to separate the steering roller from the rotating shaft during the times that the tone arm is not being used to play a record. This reduces wear on the roller which is usually of comparatively soft material, as rubber or a suitable plastic. Another advantage is that it is possible, if desired, to use a motion-multiplication means between the tone arm and the steering roller. As mentioned before, the velocity at which the tone arm moves axially of the rotating shaft is a function of the skew-angle that the tone arm makes from tangency to the portion of the groove that is being tracked. Thus, if an exceedingly small skew angle will appear as a larger angle between the roller and shaft axes the servo will be more sensitive and quicker-acting. Another advantage of my present invention is that with my new constructions, it is considerably easier to eliminate rumble owing to the motor driven shaft and/or the bearings supporting the shaft, slight misalignments, etc, which may occur in the simplest form of tone arm constructed with the steering-roller concept. A further advantage is that the tone arm can be fully balanced and a separate means, e.g. a spring, can be used to provide the necessary vertical force for the stylus to engage the record groove.

An objective of my invention is to provide improvements along the lines discussed above in tone arms having a mechanical, bi-directional servo, to eliminate objectionable stylus-to-groove side pressures.

Another object of my invention is to provide a tone arm of the general type disclosed in my copending application, with a support for the steering roller which enables me to include many refinements in the tone arm assembly as, for example, those leading to the previously discussed advantages.

Other objects and features will become apparent in following the description of the illustrated forms of the invention.

Figure 1:
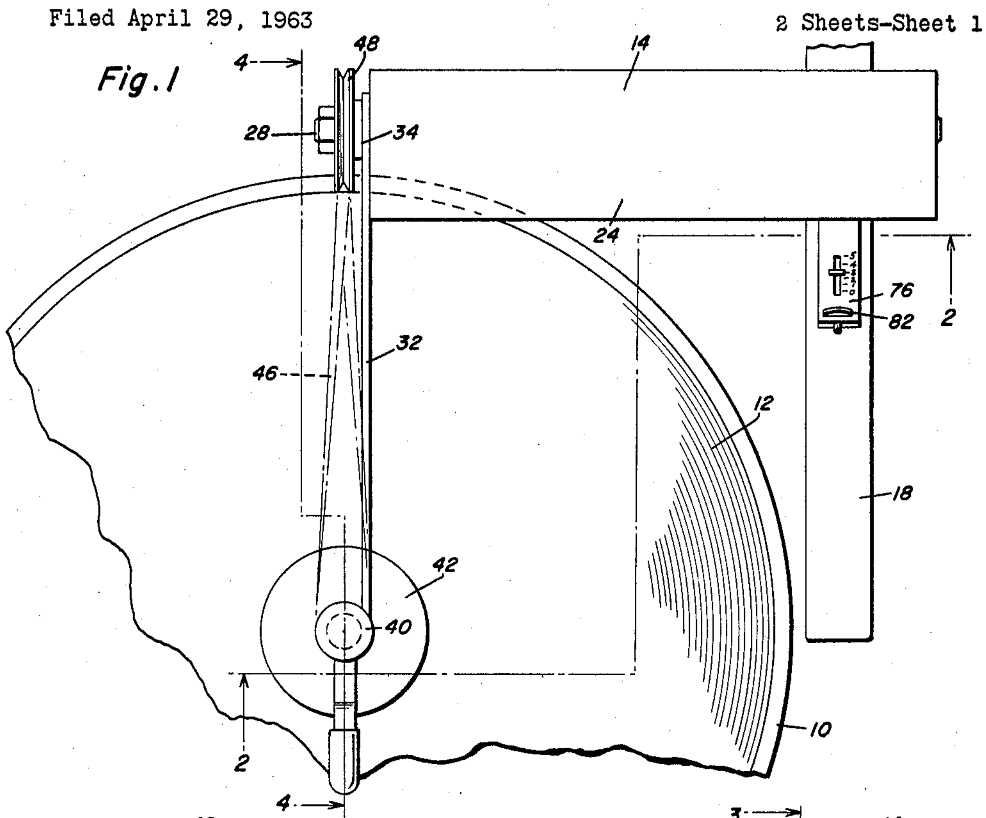
FIGURE 1 is a top view of one embodiment of my tone arm assembly.
Figure 2:
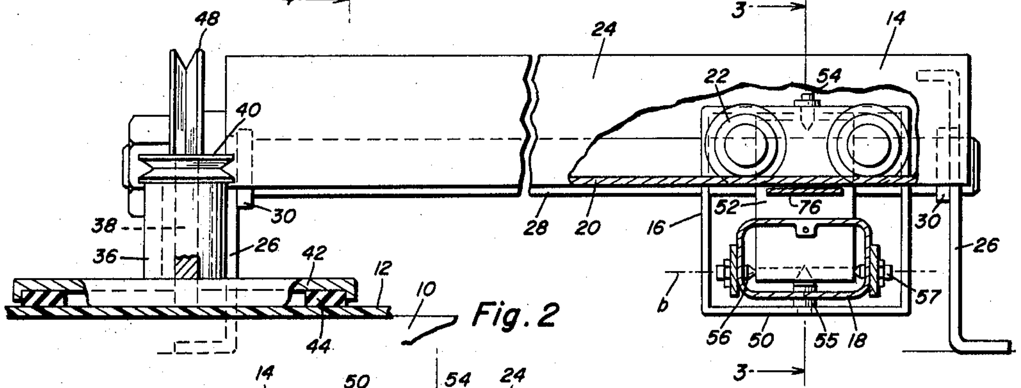
FIGURE 2 is a sectional view taken approximately along the line 2—2 of FIGURE 1.

FIGURES 1 and 2 show a conventional turntable 10 with a spiral groove record 12 mounted thereon in the usual manner. My tone arm assembly in FIGURES 1–4 is made of a guide 14 for a horizontally movable support, e.g. carriage 16, to which tone arm 18 is pivoted. Guide 14 can be of any construction which serves the purpose, for example a pair of parallel rails 20, 21 (FIGURE 3) on which the wheels 22 of carriage 16 are constrained to move in a straight line. Thus, carriage 16 supports the tone arm, and guide 14 constrains the movement of the carriage. It is preferred that guide 14 have cover 24 or the equivalent, to exclude dust from the carriage area. A pair of mounting brackets 26 are attached to (or form a part of) the ends of the guide 14 so that it can be located adjacent to turntable 10 with the longitudinal axis of the guide as shown with respect to turntable 10.

Figures 4, 5:
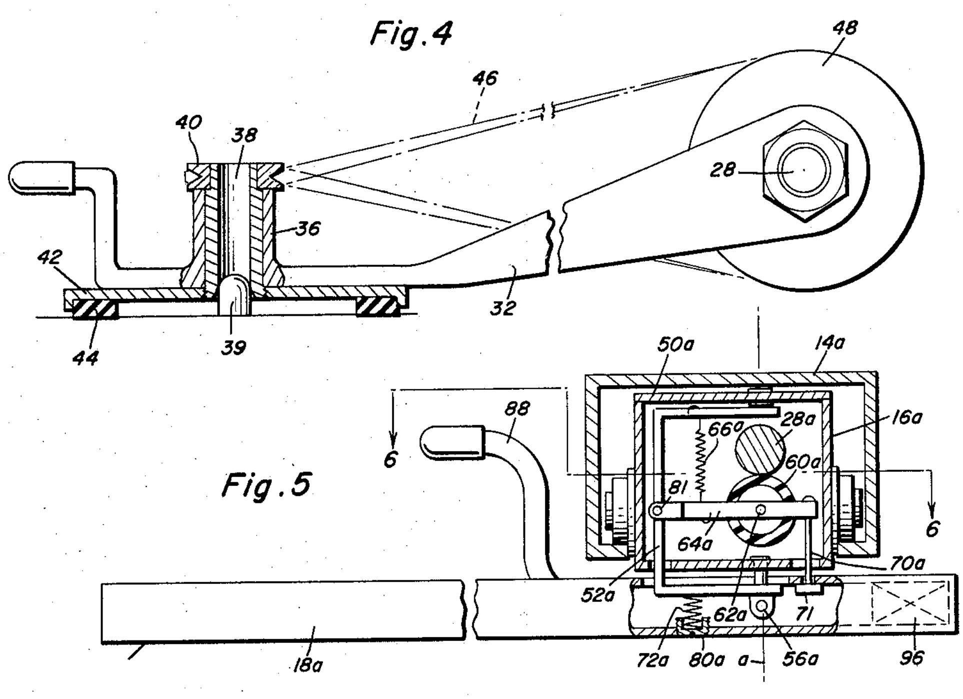
FIGURE 4 is a sectional view taken on line 4—4 of FIGURE 1.
FIGURE 5 is a sectional view showing another form of my tone arm assembly.

As in the J. Rabinow patent, No. 3,129,946, a smooth, rotary shaft 28 is mounted in bearings 30 of guide 14. Also, rotary shaft 28 can be rotated by an electric motor, or it can be rotated by a mechanical motor, or it can be rotated by turntable 10 (FIGURES 1, 2 and 4). The latter arrangement eliminates an electrical or mechanical motor and thereby eliminates a possible source of noise.

As illustrated, bracket 32 is mounted on shaft 28 by means of bearing 34 to allow the bracket to be raised and lowered with respect to guide 14, although it is possible to attach bracket 32 to the guide in which case the entire guide will be hinged on mounting brackets 26 whereby the entire tone arm assembly can be raised and lowered when the bracket 32 is manually lifted. In either case, one of the purposes of bracket 32 is to support an outer bearing 36 in which vertical drive shaft 38 is rotatively mounted. At least the lower part of shaft 38 is allow to accept the record spindle 39 of turntable 10 (FIGURE 4). A pulley 40 (or the equivalent) is attached to the uper end of shaft 38, and friction driver 42 is secured to to the lower end of this shaft. The friction driver is made of a friction pad 44 attached to a suport frame, disc or the like which is rigidly secured to the lower end of shaft 38. The diameter of the friction driver is approximately the size of a record label and is adapted to rest on the label to be driven by the rotation of the turntable and record. Flexible belt 46 is engaged with pulley 40 and pulley 48 which is secured to shaft 28. Thus, as the turntable turns, shaft 28 is rotated.

Carriage 16 (FIGURES 2 and 3) is composed of a first member in the form of an outer frame 50, and a second member in the form of an inner frame 52, each having various walls and openings as shown in these figures. The outer frame has an upper part which fits between rails 20, 21 and has wheels 22 to rotate on rails 20, 21 as the carriage is rectilinearly moved. Thus, outer frame 50 is capable of horizontal linear motion. Inner frame 52 is connected to the outer frame by means of vertical pivots 54, 55 (or the equivalent) so that the inner frame can move pivotally about axis "*a*" (FIGURE 3) through the pivots 54, 55. Tone arm 18 is attached to the lower part of inner frame 52 by means of horizontal pivots 56, 57 (or the equivalent) in a manner that the tone arm can pivot in a vertical plane about horizontal axis "*b*" (FIGURE 2). Thus, vertical motions of tone arm 18 are isolated from the carriage, but horizontal motions of the tone arm are transmitted by way of pivots 56, 57 to the inner frame 52, causing it to pivot about vertical axis "*a*."

Figure 3:
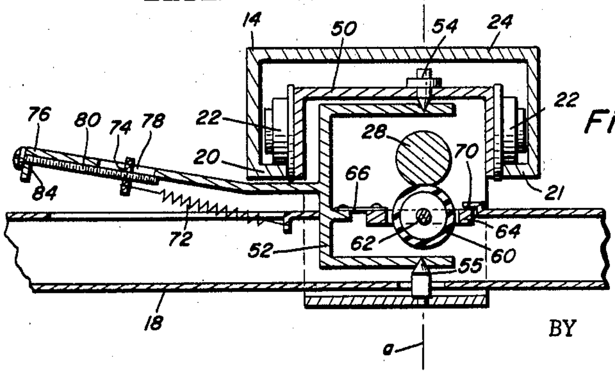
FIGURE 3 is a transverse sectional view taken along the line 3—3 of FIGURE 2.

In the embodiment of FIGURES 2 and 3, the combined drive and steering roller or wheel 60 (which is equivalent or identical to the corresponding wheel in the above patent) is held in contact with the lower surface of shaft 28 instead of the upper surface as shown in the above patent, to reduce the profile of the tone arm assembly. Further, wheel 60 is held in contact with the surface of the smooth shaft 28 by spring pressure instead of merely resting thereon. To accomplish this, wheel 60 is mounted for rotation on or with shaft 62 which is supported in bearings attached to or formed in a small frame 64. The frame is connected to inner frame 52 of the carriage by means of a leaf spring 66 or the equivalent (shown in other embodiments). The bias of the spring 66 is in a direction to press the resilient surface of roller 60 in contact with the smooth surface of rotary shaft 28. Thus, when the tone arm 18 moves left or right, frames 52 and 64 are correspondingly moved thereby skewing the axis of the roller shaft 62 with respect to the axis of rotation of shaft 28. This introduces a horizontal component of motion to inner frame 52 by way of wheel 60, shaft 62, frame 64 and spring 66. The inner frame 52, the force component is transmitted through pivots 54, 55 to the outer frame 50, causing it (and thus the entire carriage) to move horizontally as constrained by support 14. As in the above patent, the direction of the force component will depend on the direction of the angle of skew between the axes of rotary shaft 28 and the shaft 62 of the wheel 60. Since I disclose a straight line motion tone arm, the arm is designed to move in a manner so that the arm-stylus is always tangent to the portion of the record groove being tracked. Any deviations from tangency result in very slight skew of the tone arm which is immediately detected by the skew of the axis of wheel 60 with respect to the axis of shaft 28, and is corrected by motion of carriage (and thus the pivoted end of the tone arm) axially of shaft 28. Objectionable side pressures between the stylus and record groove walls are not a problem because my servo system provides the necessary correction as soon as there is a tendency for side pressures to build up.

When tone arm 18 is lifted manually or automatically (as shown and described in the above patent) or otherwise, it can be latched in an elevated position by any suitable latch, e.g. a magnet or a mechanical latch or over-center weight as in the pending application. As far as my present invention is concerned, the elevation of the stylus end of the tone arm is accompanied by separation of the wheel 60 from the rotating shaft 28 to prevent premature wear of the wheel and/or shaft 28. FIGURE 3 shows lip 70 on the upper part of tone arm 18, which engages a part of the wheel frame 64 when tone arm 18 is lifted, and lip 70 moves frame 64 downward with respect to shaft 28 against the yielding opposition of spring 66. As soon as the stylus end of the tone arm is lowered, lip 70 is raised thereby allowing spring 66 to return wheel 60 to the shaft (28)-engaging position.

Arm 18 can be balanced in any number of ways, one of which is to use spring 72 (FIGURE 3) attached to the upper part of arm 18 and to a captive nut 74 which is adjustable along the length of bracket 76 attached to and projecting forwardly from inner frame 52. Nut 74 is constrained by slot 78 of bracket 76 and is moved forward and backward to tension and relax spring 72 (thereby adjusting the vertical force of the stylus on the record) by screw 80 which passes through an opening 84 in slide 76 and through the nut 74.

Figures 6, 7, 8:
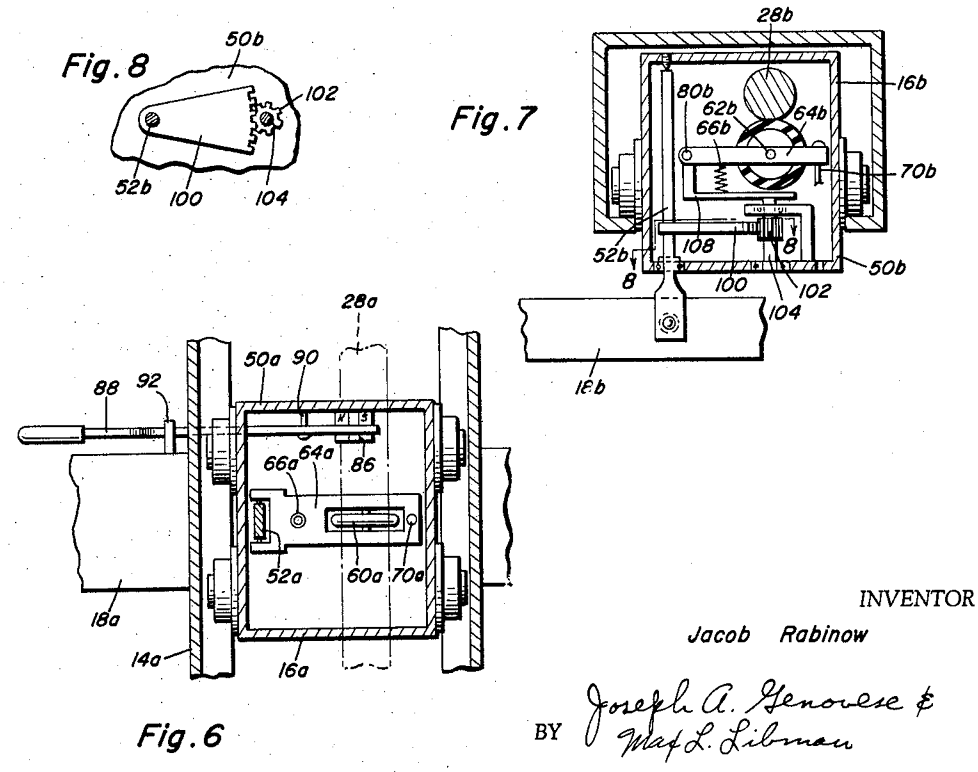
FIGURE 6 is a sectional view taken on line 6—6 of FIGURE 5.
FIGURE 7 is a sectional view of another form of my tone arm assembly.
FIGURE 8 is a sectional view taken on line 8—8 of FIGURE 7.

FIGURES 5 and 6 show another form of my invention, which functions in a manner very similar to the embodiment of FIGURES 2 and 3. Accordingly, guide **14*a* contains horizontally movable carriage 16*a* composed of outer frame 50*a* and inner frame 52*a***. The inner frame can pivot about vertical axis "*a*" due to the pivot connection between frames **50*a* and 52*a*. The tone arm 18*a*** can pivot vertically about the axis of horizontal pivot 56a which couples the tone arm to inner frame 52a.

Wheel 60a is supported by shaft 62a which is connected with the wheel frame 64a. The wheel 60a contacts the smooth surface of shaft of 28a in a manner identical to the embodiment of FIGURE 3, and it responds to the arm skew conditions exactly as described before. One of the main distinctions between the embodiments of FIGURES 3 and 5 is that frame 64a is connected by a pivot pin 81 to inner frame 52a, and spring 66a is attached to frame 64a and the top part of inner frame 52a. Spring 66a is a tension spring, and in this form of my invention makes it somewhat easier to adjust the tension of spring 66a and thus, the engaging force between wheel 60a and shaft 28a. This embodiment serves to further isolate the mechanical action of my servo from the tone arm and its pick-up. Thus, rumble and other disturbances, due to dirt and/or inaccuracies of the rolling members, are minimized.

The means for separating roller 60a from shaft 28a as the stylus-end of arm 18a is lifted, are also somewhat different from the corresponding means in FIGURE 3. I have a rod 70a connected to frame 64a and it passes through an opening in the top part of tone arm 18a (FIGURE 5). The portion of the rod within the cavity of the tone arm has an enlargement 71 which is contacted by the upper inner surface of tone arm 18a when the tone arm is lifted, thereby causing the rod 70a to pull frame 64a downward and away from shaft 28a against the opposition of spring 66a.

In this form of my invention I have a manual device to facilitate lifting the tone arm, together with a magnetic latch 86 to hold the tone arm in an elevated position (FIGURE 6). The magnet is secured to a part of outer frame 50a, and lever 88 is pivoted at 90 to outer frame 50a. Pin 92 is secured to tone arm 18a in a position to be engaged by lever 88 when the lever is elevated, thereby lifting the tone arm. When the lever is lifted sufficiently far, the inner end is engaged and held by magnet 86. Obviously, a mechanical latch could be substituted for magnet 86 in this and/or the other forms of my invention.

As shown in FIGURE 5 spring 72a contacts the lower surface of inner frame 52a and an adjustment screw 80a connected to the tone arm. Accordingly, by adjusting screw 80a, the arm 18a is adjusted to provide the desired vertical stylus force on the record. I also mentioned previously that other methods for balancing the tone arm and obtaining the desired vertical stylus force can be used, such as a movable balance weight on the tone arm. Furthermore, I can use a tone arm damper in one or more of my tone arms, for example damper 96 which can be constructed like the damper described in my prior Patent No. 3,031,196.

The embodiments of FIGURES 7, 8 provides the driving force for carriage 16b and the necessary servo correction in a manner similar to the embodiments of FIGURES 3 and 5. FIGURES 7 and 8 show one method of making the servo more sensitive and faster-acting. This is accomplished by skewing the wheel shaft 62b with respect to the axis of rotary shaft 28b through an angle greater than the horizontal motion of tone arm 18b as the stylus tracks the record groove. To do this, gear segment 100 is attached to or forms a part of the inner frame 52b which, in this instance is a vertical shaft constrained to rotary motion by bearings attached to outer frame 50b. Segment 100 is in engagement with pinion 102, and the pinion is secured to shaft 104 which is constrained by suitable bearings to rotational movement. Wheel supporting frame 64b is connected by horizontal pivot 80b to a mounting bracket 108 attached to shaft 104. Thus, when the tone arm moves in a horizontal plane, the motion is transmitted to segment 100. Due to pinion 102 engaging segment 100, shaft 104 will turn through a larger arc than frame 52b thereby resulting in a greater skew of shaft 62b with respect to shaft 28b than will be the case in other embodiments of my tone arm assembly.

The embodiment of FIGURE 7 shows another difference. A leaf spring 66 is used in FIGURE 3 to press the steering wheel against the surface of shaft 28. A tension spring 66a is used in FIGURE 5 for the same purpose. In FIGURE 7 compression spring 66b interposed between frame 64b and bracket 108 to serve the same purpose.

It is understood that various modifications and alterations may be resorted to. For example, instead of using the center part of the phonograph record as a means to drive a rotary shaft 28a, I could use an electrical or mechanical motor coupled to shaft 28, 28a or 28b. Also, I could use the periphery of the turntable by appropriate belting and pulleys in order to rotate the smooth shafts of the various forms of my invention. It is, of course, understood that when the tone arm is close-coupled to the carriage as shown in FIGURES 3 and 5 (but not FIGURE 7) openings are necessary in the tone arm for the various parts of the mechanism to operate, and these are not described herein since they are obvious from the drawings. When the shaft 28 is rotated by the turntable, as in FIGURE 4, the speed of shaft 28 will be a function of the speed of the turntable. This has the interesting advantage of making the servo faster-acting for higher speed records (78 r.p.m., where required, and slower for the slower records. In those instances where shaft 28 is rotated by a separate motor, it will be necessary to use a speed-change device to obtain the same effect.

I claim:

1. In a record player for records having a groove, a tone arm provided with a stylus to track the groove and cause the outer end of the tone arm to move in a predetermined path in relation to the groove, rotary means to move the inner end of said tone arms at a rate such that the tone arm maintains a predetermined angular relation with the record groove as the stylus tracks the groove, said rotary means including a guide having a rotary shaft, a movable structure distinct from the tone arm constrained by said guide and including a member capable of pivotal movement about a first axis, means pivotally connecting said tone arm and said member for movement with said structure and also for pivotal motion about said second axis with respect to said structure and member, and a wheel connected with said member and engaging said rotary shaft and responsive to the pivotal motion of said tone arm and member about said first axis for imparting a component of force to said movable structure from said rotary shaft and in a direction which causes said structure to move in a manner to displace said inner end of the tone arm as said stylus tracks the record groove thereby eliminating tracking error.

2. The subject matter of claim 1 and means responsive to the pivotal motion of said tone arm about said second axis in a direction to lift the stylus from the record groove for separating said wheel from said rotary shaft.

3. The subject matter of claim 1 and resilient means maintaining said wheel in contact with said shaft.

4. The subject matter of claim 3 and means responsive to pivotal movement of said tone arm in a manner to lift the stylus from the record groove for separating said wheel from said shaft against the opposing force of said spring.

5. The subject matter of claim 4 and means operatively with said tone arm to latch said tone arm in the raised position at which said wheel remains free from said rotary shaft.

6. The subject matter of claim 1 and a turntable to mount the record for rotation, and means connected to said shaft to rotate said shaft from power made available by said turntable.

7. In a phonograph record player having a turntable to support and rotate a record, a guide adjacent to said turntable, a support on said guide and constrained by said guide to substantially straight-line motion tangent to the part of the record groove being tracked, a tone arm having a stylus adapted to track the record groove, means for propelling said support along said guide, mechanical servo means coupling said tone arm to said support and engaging said propelling means and responding to tone arm skew for changing the speed of support propulsion, said support propelling means including a shaft, and means to rotate said shaft from the power available as a result of the rotation of said turntable.

References Cited by the Examiner

UNITED STATES PATENTS

| | | | |
|---|---|---|---|
| 2,915,315 | 12/1959 | Rabinow | 274—23 X |
| 3,129,946 | 4/1964 | Rabinow | 274—23 |

NORTON ANSHER, *Primary Examiner.*

EVON C. BLUNK, *Examiner.*

C. B. PRICE, *Assistant Examiner.*